United States Patent [19]

Nakaya et al.

[11] Patent Number: 4,988,529
[45] Date of Patent: Jan. 29, 1991

[54] MILK SHAKE AND MANUFACTURING METHOD THEREOF

[75] Inventors: Tsunemoto Nakaya; Taizo Karasawa; Nobuyuki Kihara; Yukihiro Wada, all of Osaka; Masao Kiyota, Hyogo, all of Japan

[73] Assignee: Nissei Kabushiki Kaisha, Osaka, Japan

[21] Appl. No.: 328,528

[22] Filed: Mar. 24, 1989

[51] Int. Cl.$^5$ .......................... A23G 9/02; A23L 2/38
[52] U.S. Cl. ................................ 426/569; 426/565; 426/590; 426/592
[58] Field of Search ............... 426/569, 584, 565, 566, 426/567, 590, 592

[56] References Cited

U.S. PATENT DOCUMENTS

| | | | |
|---|---|---|---|
| 2,507,482 | 5/1950 | Scott | 426/569 |
| 2,941,885 | 6/1960 | Tomlison | 426/569 |
| 3,291,076 | 12/1966 | Flanigan et al. | 426/565 |
| 3,479,187 | 11/1969 | Arbuckle | 426/569 |
| 3,914,440 | 10/1975 | Witzig | 426/565 |
| 4,031,261 | 6/1977 | Durst | 426/569 |
| 4,310,559 | 1/1982 | Mita | 426/565 |
| 4,374,155 | 2/1983 | Igoe | 426/569 |
| 4,552,773 | 11/1985 | Kahu et al. | 526/569 |
| 4,571,338 | 2/1986 | Okonogi et al. | 426/584 |
| 4,737,372 | 4/1988 | Bender | 426/569 |
| 4,738,862 | 4/1988 | Bee | 426/565 |
| 4,746,523 | 5/1988 | Binley | 426/565 |
| 4,798,734 | 1/1989 | Kaneda | 426/565 |
| 4,808,428 | 2/1989 | Forsstrom et al. | 426/569 |
| 4,826,656 | 5/1989 | Stuber et al. | 426/565 |
| 4,830,868 | 5/1989 | Wade | 426/565 |

FOREIGN PATENT DOCUMENTS 2904632 8/1979 Fed. Rep. of Germany ...... 426/565

Primary Examiner—Jeanette Hunter
Attorney, Agent, or Firm—Flehr, Hohbach, Test, Albritton & Herbert

[57] ABSTRACT

The invention relates to milk shakes wherein ingredients of 45-70 weight % of water, 15.3-40 weight % of carbohydrates containing 15-35 weight % of sugar and 0.3-1.3 weight % of alcohol, and 1-7 weight % of protein and 1-25 weight % of oil/fat are mixed and ice cream obtained by filtering, homogenizing, sterilizing, cooling, aging, freezing at an overrun percentage of 10 to 100, kneading with tiny pieces of ice, filling in packing containers and hardened and the ice cream so obtained is shaken and mixed at a temperature in a range of −20° C. to 8° C. with or without addition of some syrup such as a fruit sauce or the like to make a milk shake.

17 Claims, No Drawings

MILK SHAKE AND MANUFACTURING METHOD THEREOF

FIELD OF THE INVENTION

The present invention relates to a milk shake beverage which can be made from such a special kind of ice cream with or without tiny pieces of ice mixed therein, as is soft enough to be scooped up with a spoon and can be frozen-stored in a freezing stocker, freezing chamber or the like in homes or in retail shops, and by simple beating with or without addition of some syrup such as a fruit sauce and a manufacturing method thereof.

BACKGROUND OF THE INVENTION

Usually a milk shake beverage is made by the use of a special freezer exclusively for the purpose of production by a process comprising steps of whipping, freezing, adding some syrup, shaking, and mixing continuously and in lumps.

Special freezers and shake servers are however, quite expensive and large and hence cannot be installed easily. Such machines are difficult to install especially in ordinary homes or small retail shops.

In small retail shops or the like which cannot afford installation of a shake server, it is sometimes the case that a milk shake is made by mixing ice-cream, milk, fruit sauce et cetera. The ice cream is hardened by reducing the temperature to below $-15°$ C. such that it can no longer be scooped with a spoon. Hence, the ice cream taken out of a freezer or freezing chamber whose inside temperature is approximately $-20°$ C. to $-8°$ C. cannot be mixed with a fruit sauce or the like by a simple mixer or beater and a milk shake beverage can be made only by softening the hardened ice cream by adding a liquid of room temperature such as milk.

A milk shake beverage made by the aforementioned method, however, is a mixture of ice cream with milk, fruit sauce or the like of room temperature, hence it is low in the content of micro-crystalline ice and lacks in icy feeling, and the "feeling to the tongue" is like that of a liquid having ice cream melted therein or an ice cream milk definitely different from the taste of a genuine milk shake which is made by the use of "shake server".

Although the milk shake made by the use of a shake server has a degree of icy feeling due to micro-crystalline ice, in the mid-summer season, for instance, a still further cool, refreshing taste is possibly required. With the milk shake made by mixing ice cream and milk or the like, there is a noted lack in icy feeling, and by far a richer icy feeling is required.

In small retailer's shops or the like, it seems to be theoretically possible to put countless tiny pieces of ice into a shake server, mixer or the like and to shake and mix the ice cream with tiny pieces of ice so that milk shake will be rich in icy feeling to the tongue.

It is, however, extremely difficult to keep tiny pieces of ice at a proper temperature in small retailer's shops. This is the same even when a shake server is used for making milk shake, for storage under proper temperature control of tiny pieces of ice has to be done in small retailer's shops or the like.

If the temperature control in storage of tiny pieces of ice is not proper, a part of the tiny pieces of ice down and if the storage temperature is then lowered to approximately $-20°$ C. to $-8°$ C., the once-melted tiny pieces of ice will stick together and be refrozen. Then, the tiny pieces of ice are refrozen in more or less large blocks and can no longer be mixable and even if mixing is feasible, the taste of the milk shake is bound to be badly spoiled. Hence in small retailer's shops or the like milk shake is actually being made without addition of tiny pieces of ice which need very difficult temperature control.

SUMMARY OF THE INVENTION

It is a primary object of the present invention to provide a high-quality milk shake product which can be made from a special kind of ice cream stored in a normal freezer or the like and a simple mixer or beater without using a shake server.

Another object of the present invention is to provide a milk shake product having an essential ice creamy feeling to the tongue like the one made by the use of a special freezer for milk shake-making (shake server), being not too sweet and also free of alcoholic smell and/or fatty greasy taste.

Still another object of the present invention is to provide a milk-shake product containing tiny pieces of ice and particularly rich in icy crystal feeling to the tongue.

A further object of the present invention is to provide a method for manufacturing a high-quality milk shake product without the use of any shake server.

Still a further object of the present invention is to provide a method for manufacturing a milk shake product not too sweet, free of alcoholic smell and/or fatty greasy taste and having a good ice crystalline feeling to the tongue like one made by the use of a shake server.

Another object of the present invention is to provide a method for manufacturing a milk shake product containing tiny pieces of ice particularly rich in icy feeling to the tongue.

For accomplishment of these objects a milk shake product of the present invention features that the ice cream as its material comprises 15.3–40 weight % of carbohydrates containing 15–35 weight % of sugar and 0.3–1.3 weight % of alcohol, and 1–7 weight % of protein and possibly 1–25 weight % of oil/fat and its overrun percentage ranges from 10 to 100.

Another milk shake product of the present invention features that its ice cream ingredient comprises 15.3–40 weight % of carbohydrates containing 15–35 weight % of sugar and 0.3–1.3 weight % of alcohol, and 1–7 weight % of protein and 1–25 weight % of oil/fat and its overrun percentage ranges from 10 to 100, having distributed therein countless tiny pieces of ice.

A method of manufacturing a milk shake product of the present invention features that in a step of mixing ingredients 15.3–40 weight % of carbohydrates containing 15–35 weight % of sugar and 0.3–1.3 weight % of alcohol and 1–7 weight % of protein and possibly 1–25 weight % of oil/fat are mixed, and an ice cream made by freezing this mixture at an overrun percentage of 10 to 100 is simply beaten with or without addition of some syrup such as a fruit sauce or the like.

Another method of manufacturing a milk shake product of the present invention features that in a step of mixing ingredients 15.3–40 weight % of carbohydrates containing 15–35 weight % of sugar and 0.3–1.3 weight % of alcohol, and 1–7 weight % of protein and 1–25 weight % of oil/fat are mixed, ice cream is made by freezing this mixture at an overrun percentage of 10 to 100 and having mixed and distributed therein countless tiny pieces of ice, and the resulting ice cream is simply beaten with or without addition of some syrup such as a fruit sauce to make a milk shake product in a temperature range of −20° C. to −8° C.

Still another method of manufacturing a milk shake product of the present invention features that in a step of mixing ingredients 45-70 weight % of water, 15.3-40 weight % of carbohydrates containing 15-35 weight % of sugar and 0.3-1.3 weight % of alcohol, and 1-7 weight % of protein and 1-25 weight % of oil/fat are mixed and the ice cream produced by a process comprising steps of filtration, homogenization, sterilization, cooling, aging, freezing at an overrun percentage of 10 to 100, filling into packing containers and hardening is simply beaten with or without addition of some syrup such as a fruit sauce or the like to make a milk shake product.

DESCRIPTION OF THE EMBODIMENTS

A preferred embodiment of the present invention is described below in detail.

First, explanation is made of the step of preparing a mixture of ingredients.

In the mixing step ingredients are mixed in a mixing tank or by the use of a mixer automatically or manually and heated up to, for example, 50° C.

The dissolved mixture of ingredients is heated and then fed to a homogenizer after filtration to eliminate foreign matters or objects. By this machine the oil and fat components contained in the mixture, large in particle size are broken into finer globules to be eventually mixed and emulsified perfectly and is homogenized thereby.

The homogenizer used therefor may as well be of the 1-phase type in which the mixture of ingredients is pressurized only once but it is preferred to use a 2-phase counterpart designed for pressurizing the mixture twice, that is, first at a primary pressure and then at a secondary pressure. In a homogenizer of the 2-phase type the primary pressure is set at, for instance, 140 kg/cm$^2$ and the secondary pressure at, for instance, 35 kg/cm$^2$, in other words the pressure is totally set at 175 kg/cm$^2$. With the homogenizer of the 2-phase type the oil and fat components in the mixture of ingredients can be homogenized to fine globules of, for instance, 1 μm or so.

Sterilizing may be done either before or after homogenization. Sterilization is done, for example, by heating with a or the like and, more concretely, the mixture is heated, for example, for 30 minutes at not less than 68° C. (in other words pasteurization).

Within the scope of thermal sterilizing effect described above, any combination of temperature and time may be chosen freely.

It is also possible to prepare a liquid mixture of long life, for instance, by first carrying out doing sterilization for 3-5 seconds at not less than 140° C. and then filling aseptic containers with the sterilized mixture by using a sterilized filling machine. As the sterilizer for use in the sterilizing steps there are cited, among others, batchwise sterilizer, HTST sterilizer and UHT sterilizer. The sterilized mixture is cooled, for example, by means of a plate cooler and then fed into an aging tank or a balance tank before the filling step.

In the freezing step, the mixture is frozen while being stirred or whipped. The change in the ratio of weight per volume of the mixture of ingredients resulting from the aeration is usually determined by the overrun percentage represented by the following formula:

$$\text{Overrun}(\%) = (Wo - Ww)/Ww \times 100$$

wherein Wo represents the weight of the mixture of ingredients of a given volume and Ww represents the weight of the whipped mixture of a given volume.

According to the present invention, the volume of air which is blown in is so controlled that this overrun percentage is in a range of 10 to 100, preferably 40 to 80.

As the freezer for use in the freezing step, there are the batchwise type and the continuous type. The method of cooling includes the brine cooling by which the cooling is effected by a cold brine, the ammonia direct expansion cooling by which the cooling is effected by means of an ammonia gas cooled by an endothermic reaction induced by adiabatic expansions and the cooling by a gas such as freon.

The half-frozen mixture after a step of freezing is in the form of an ice cream product like soft serve ice cream. Thus, by kneading this ice cream with countless tiny pieces of ice added, if necessary, by the use of, for instance, a fruit feeder or the like, it is possible to have countless tiny pieces of ice distributed in the ice cream. Since the temperature of ice cream at this step is lower than the melting point of ice, there is no possibility of the tiny pieces of ice melting and sticking together to form large ice blocks. The aforementioned tiny pieces of ice are obtainable, for instance, by crushing blocks of ice or by dripping water into a freezing atmosphere formed by means of a refrigerant.

The aforementioned ice cream containing countless tiny pieces of ice is then, continuously fed into, a filling and packing machine fill packing containers uniformly therewith.

The packed ice cream with or without countless tiny pieces of ice is hardened quickly at a freezing temperature of, for instance, −20° C. to −40° C. in the hardening step before it is distributed as a commercial product. In this hardening step, a hardening tunnel, and a hardening chamber are used.

After the hardening step, the packed ice cream, (or ice cream packs) is placed in larger packing containers such as corrugated cartons or the like to be sent to a warehouse for storage or shipping out. The process described above is normally carried out on an industrial scale in a factory. In the distribution stage, ice cream packs packed in corrugated cartons are stored until they are shipped in a frozen state at a temperature of approximately −15° C. to −30° C. to consumers, small retainer's shops or the like.

The ice cream packs thus delivered to consumers or small retailer's shops or the like are kept for a while at a temperature approximately in a range of −20° C. to 8° C. in a freezer or a freezing chamber. Consumers or other users then take the packed ice cream out of the freezer or freezing chamber, scoop it out into cups and then simply beat it with or without addition of some syrup such as a fruit sauce before drinking it as milk shake.

For the aforementioned simply beating an ordinary mixer or spinner may be used but preferred are Nissei Wild Mixer Model M 150 (Nissei K.K. [Japan]: trade name) and Hamilton Beach Drink Mixer (Hamilton Beach Division., Inc. [U.S.]: trade name). By using either of the above, high-quality milk shake is obtainable without fail. It is also possible for a user to beat it by hand.

Examples of the syrup or the like to be mixed with ice cream and to be beaten include chocolate-syrup, vanilla syrup and others having different tastes and flavors.

Next, a preferred method of preparing ingredients for the aforementioned ice cream is explained. The main ingredients of the milk shake according to the present invention are water, carbohydrates containing sugar and alcohol, protein and oil or fat, but this does not mean precluding further addition of emulsifiers, stabilizers, flavors, seasonings, coloring agents et cetera reasonably. The water content is, however, limited to be in a range of 45–70 weight %.

Examples of emulsifier to be used include (1) hydroxyl lecithin, (2) mono-, di- or polyglycerides of fatty acid such as monostearin or monopalmitin, (3) polyoxyethylene ether of sorbitan monostearate (polysorbate 60 or 80) or polyoxyethylene ether of fatty acid ester of polyhydric alcohol such as polyoxyethylene ether of sorbitan distearate, (4) fatty acid ester of polyhydric alcohols such as sorbitan monostearate, (5) mono- and di-ester of glycol such as propylene glycol monostearate and propylene glycol monopalmitate, (6) succinoylated monoglyceride, (7) sodium or potassium stearoyl-2-lactylate and (8) esters of carboxylic acid such as lactic acid, citric acid and tartaric acid or the like with mono- and diglycerides of fatty acids such as glycerol lactopalmitate and glycerol lactostearate or the like.

Examples of stabilizer include waterbinding gum, gelling agents and blocking agents the like. Usable examples of waterbinding gum include locust bean gum, guar gum, tara gum, PGA, CMC et cetera. Examples of gelling agent which may be used include gelatin, xanthan gum, carrageenan, sodium alginate and pectin or the like. Of these gelling agents, carrageenan is effective also for prevention of whey-off and stabilization of colloids or the like. Preferred examples of blocking agent include microcrystalline cellulose.

In the present invention carbohydrate is composed of three elements only, namely carbon, hydrogen and oxygen, and appears to contain all compounds formed through combination of carbon and water, including cellulose, starch and sugar. The content of carbohydrates including starch, sugar and alcohol is limited to be in a range of 15.3–40 weight %.

In the present invention sugar is meant to be sugars except polysaccharides including cellulose, starch and the like. Sugars are known to largely influence the extent of lowering of the freezing point, sweetness, body, texture, and taste. Excessive addition of sugar is known to cause excessive softness, excessive sweetness, burning sensation and the like. According to the present invention, the content of sugar is limited to be in a range of 15–35 weight %. It is not to have the content of sugar decrease to 15 weight % or less, for it causes to make it too hard and interferes with proper shaking and mixing in a temperature range of $-20°$ C. to $-8°$ C. On the other hand, it is not favorable to have the sugar content in excess of 35 weight % because it causes excessive sweetness.

Examples of known types of sugar include monosaccharides such as glucose, disaccharides such as lactose and sucrose, oligosaccharides, corn syrup, sugar-alcohols such as sorbitol and polyhydric alcohols good for drinking.

As alcohol, all drinkable alcohols are usable. According to the present invention, the alcohol content is limited to be in a range of 0.3–1.3 weight %. It is not favorable if its content is 0.3 weight % or less, for it causes decrease of softness and also interferes with proper shaking and mixing in a temperature range of $-20°$ C. to $-8°$ C. On the other hand, if its content is 1.3 weight % or more, the alcoholic smell becomes too strong.

Protein is effective for improving whipping property and stability after being whipped. Usable as protein are among others, milk protein such as whey protein and milk casein, soybean protein and egg albumin or the like. Such proteins are supplied as they are and also as ingredients of the ice cream ingredients such as skim milk powder and whey powder. Of these proteins, most preferred is milk protein because it is capable of imparting or improving the whipping behavior, smoothness, taste, mouth feel, melt resistance and effect to lower the freezing point. The protein content is limited to be in a range of 1–7 weight %. It is not favorable to have its content decrease to 1 weight % or less because it causes marked lowering of whipping property and stability after being whipped. On the other hand, neither is it favorable to have its content increase to 7 weight % or more, for the milk shake is then caused to be too viscous and less suited for drinking.

Oil or fat may be added, if necessary, for it improves the creamy feeling to the tongue, and imparts melt resistance as well as softness. Examples of preferred types of oil and fat include various kinds of vegetable oils such as cotton seed oil, soybean oil, corn oil, sun-flower oil, palm oil, palm kernel oil, peanut oil, rice oil, safflower oil, coconut oil and rape seed oil and animal fats such as butter fat and one or more thereof may be used as desired. The oil/fat content is limited to be 1–25 weight %. If it is 25 weight % or more, it is not favorable, for the product takes on a fatty greasy taste and/or smell.

Countless tiny pieces of ice mixed if and as necessary in ice cream may be of simple water but may as well be of water admixed, for instance, with some fruit juice, fruit particles or pieces, sugar, stabilizer, pigment, flavor, acidic seasoning and other tasty substances, with combinations of melt resistance or original flavor and color tone taken into consideration. As to the size of the tiny pieces of ice, it is desirable that they be no larger than the diameter of the straw used for drinking milk shake. This is necessary not to interfere with drinking milk shake by using a straw. The aforementioned tiny pieces of ice must be not more than 10 mm in diameter and, preferably, in a range of 1–5 mm or so when the quick solubility in the mouth is taken into due consideration. As to the proportion in quantity of tiny pieces of ice to ice cream, no sufficient cool, refreshing taste is enjoyable if the portion of tiny pieces of ice is too small, while milk shake's unique taste of creaminess is more or less lost if its portion is too large. Hence it is usually preferable to have the ice's portion properly adjusted in a range of 3–50 weight %.

There will be explained next a method of measuring the softness of the ice cream of the present invention as one of its rheological properties and the instrument required therefor.

For measuring its softness, a rheometer Model NRM-2002J [trade name] and recorder R-31 [trade name] of Fudoh Kogyo K.K. was used. As the plunger for the rheometer was used an adaptor for measurement of the share for the rate of penetration having its head in the shape of an inverted cone with its tip angle of 60°, and under an ambient condition $-20°$ C. in temperature the magnitude of force required for the aforementioned head placed on the face of the soft ice cream to be tested to penetrate thereinto to the predetermined depth was measured. If the measured value is not more than 500 g, it means that beating by a mixer is feasible.

The organoleptic test of the ice cream of the present invention on the degree of oily and/or alcoholic smell, fatty greasy taste, sweetness et cetera was made by a team of, at least, three experienced testers.

The milk shake of the present invention has as its material an ice cream, from which it is prepared by simply beating with or without addition of some syrup such as a fruit sauce or the like by the use of a mixer, containing 15-35 weight % of sugar for increasing its softness, 1-25 weight % of oil/fat and 0.3-1.3 weight % of alcohol, having its overrun percentage predetermined properly in a range of 10 to 100 and containing countless tiny pieces of ice.

Hence, it is well possible to take out the required amount of ice cream kept frozen in an ordinary freezer, freezing chamber or the like and shake and mix it by the use of a mixer immediately, without addition of any liquid of room temperature such as milk and with addition of some syrup like a fruit sauce or the like, if necessary. Thus an essential milk shake being sufficiently cool, icy and ice-crystal feeling to the tongue is obtainable without using any shake server. Also, since the invented milk shake has its sugar content 15-35 weight %, it is not too sweet, has no alcoholic smell with its alcohol content being not more than 1.3 weight % and, further, has no sensible oily smell with its oil/fat content in the range of 1.-25 weight %.

Furthermore, since its overrun percentage is properly set in a range of 10-100, there is no possibility of the amount of ice crystals per unit volume of milk shake being diminished regardless of the ambient temperature, hence there is no likelihood of the taste of chilliness as it is drunk being affected.

In addition thereto, the ice cream prepared in the process of making milk shake contains, if necessary, countless tiny pieces of ice distributed therein, hence a cool, refreshing taste completely different from any conventional milk shake is imparted and the mouth feel of solid ingredients to the tongue is largely improved, the latter thanks to the tiny pieces of ice contained therein. Moreover, since the aforementioned tiny pieces of ice are mixed in the ice cream, from which milk shake is made, already in the manufacturing process in factory, it is not necessary that such tiny pieces of ice be kept or handled under severe temperature control on the part of small retailer's shops or consumers.

Next, embodiments of the present invention relating to milk shake and manufacturing method thereof are described below in detail in comparison with control examples on the basis of concrete experimental data.

The data given in Tables 1 and 2, which relate to the individual embodiments and control examples, are the results of experiments made with milk shakes not containing tiny pieces of ice. Experiments were made about 10 embodiments according to the recipes given in the columns (1-4), (1-5), (2-2), (2-3) and (2-4) of Table 1 and the columns (2-5), (3-2), (3-3), (3-4) and (3-5) of Table 2 as well as 8 control examples according to the recipes given in the columns (1-1), (1-2), (1-3), (16) and (2-1) of Table 1 and the columns (2-6), (3-1) and (36) of Table 2.

The process of preparing and treating the mixture of ingredients for ice cream is all in common for the individual embodiments and control examples except only for the overrun percentage, being as described below.

That is, these ingredients are first put into a mixing tank and heated by steam to approximately 50° C. under stirring to form an uniformly blended mixture (hereinafter called "mix") and, after elimination of foreign matter or objects by filtration, fed to a so-called "super mixer" for buffering fluctuation of flow rate and then fed to a homogenizer of 2-phase type at a constant flow rate.

In the 2-stage homogenizer first the primary pressure of 140 kg/cm$^2$ is applied to the mix followed by application of the secondary pressure, 35 kg/cm$^2$. The mean particle size of oil/fat is reduced to 10 μm or less, and the mix is emulsified to be perfectly homogenized.

In the individual embodiments and control examples the primary and secondary pressure were set in common at 140 kg/cm$^2$ and 35 kg/cm$^2$ respectively, but this does not preclude proper variation of the homogenizing pressure according to such factors as the composition, temperature and viscosity of the mix, the type and model of the homogenizer used or the like.

The homogenized mix is fed to HTST sterilizer and is quenched, quickly after sterilization by heating. The sterilization by heating is, for instance, carried out by heating the mix at 85° C. for, for instance, 30 minutes and the heated mix is quenched quickly to approximately 10° C. in 15-25 seconds thereafter The mix is then fed into an aging tank and there the mix is aged under stirring with its temperature controlled at 0° C.-10° C. with chilled water for several hours to one day. By this aging the mix's viscosity is increased and the product's texture is improved. This, however, does not preclude proceeding to the next step omitting aging.

The aged mix is fed into a freezer of batchwise or continuous type to be frozen therein by the chill transmitted via cold brine and, at the same time, air is blown in for tiny air bubbles to be embraced in the mix.

The overrun percentage indicating the amount of aeration was varied for individual embodiments and control examples as shown in Tables 1 and 2.

The mix frozen in the aforementioned step is filled in containers and after further packaging, if and as necessary, the filled containers are sent into a hardening chamber to be hardened by quick freezing to/at −40° C.

After hardening samples prepared by the recipes of the individual embodiments and control examples are measured with the aforementioned rheometer under the condition of −20° C. in ambient temperature for assessment of the rheological properties thereof.

The results of these experiments are shown in Tables 1 and 2. If the result of this measurement (rheometer reading) is not more than 500 g, it means that beating by a mixer is feasible at a temperature of −20° C. or above.

As seen from Tables 1 and 2, when the sugar content is 15.0 weight %, 17.5 weight % or 20.0 weight %, the oil/fat content is 15 weight % and the content of skim milk powder is 5 weight %, the rheometer reading comes to be 500 g or more as shown in the column (1-1) for a control example and the column (2-1) for another control example, if the alcohol content is not more than 0.3 weight %, this resulting in a marked lowering of the product's commercial value.

Meanwhile, if the alcohol content should be more than 1.3 weight %, the rheometer reading becomes to be 360g or even less as shown in the columns (1-6), (2-6) and (3-6) and, although beating is as well feasible, the alcoholic smell becomes to be strong and the product's commercial value is thus lowered.

When the ice cream as material of milk shake is shipped as a commercial product, after a hardening step the filled containers or packs are packed in a corrugated carton and wrapped. Then in the distribution channel it is kept in a frozen state not more than −30° C. to be eventually stored in a temperature range of −20° C. to −8° C. retailer's shop or consumer's home or the like. And, the amount required each time is taken out, and beaten by the use of a mixer with or without addition of some syrup such as a fruit sauce. Since the aforementioned ice cream is made to retain a proper degree of softness at a temperature in a range of −20° C. to −8° C., the ice cream can be taken out of, for instance, a freezer whose inside temperature is −20° C. to −8° C. for beating by a mixer immediately thereafter. Also, since beating are feasible even without melting by addition of milk or the like of room temperature, an essential milk shake with a sufficient state of chilliness and icy taste is obtainable.

Then, the result of the experiment made with an ice cream containing tiny pieces of ice is as shown in Table 3. The conditions of experiment are the same as those for the experiments whose results are shown in Tables 1 an 2, except the followings.

That is, the ingredients of the ice cream for milk shake and the formulation thereof as well as other conditions are made to be the same as shown in Table 3 and also the quick quenching temperature after sterilization by heating is set at 10° C. or less and, after completion of the freezing step at a given overrun percentage, the resulting ice cream is kneaded with addition of countless tiny pieces of ice by the use of a fruit feeder, while freezing at −6° C. by a freezer. The aforementioned tiny pieces of ice is made by crushing ice blocks to be 5 mm maximum in diameter. The mixing proportion of crushed ice to ice cream is set at 10 weight %.

As is apparent from Table 3, an ice cream for milk shake well beatable and rich in the cool, referring taste is obtainable. As described above, the milk shake and the manufacturing method thereof feature that, in order to increase softness of the ice cream to be beaten by a mixer, the ice cream's ingredients contain, at least, 15.3–40 weight % of carbohydrates containing 15–35 weight % of sugar and 0.3–1.3 weight % of alcohol, and 1–7 weight % of protein and 1–25 weight % of oil/fat, and the overrun percentage is set at 10–100, hence it can be stored at a temperature in a range of −20° C. to −8° C. without any risk of melting or collapsing and has a degree of softness enough to enable beating.

Hence, when such ice cream is stored in a freezing stocker or a freezing clamber of an ordinary refrigerator at a temperature in a range of −20° C. to −8° C., it is possible to make milk shake by taking out the required amount of ice cream into a mixer and then immediately starting to beat with or without addition of some syrup such as a fruit sauce and with no addition of any liquid of room temperature such as milk or the like. Thus, there is no possibility of the ice cream being dissolved due to the addition of milk or the like before beating is started, an essential milk shake having a sufficient taste of chilliness and icy taste is obtainable without fail.

Also, since the sugar content is in a range of 15–35 weight %, the milk shake thus obtained is not too sweet and with an alcohol content of not more than 1.3 weight % there is no worry about alcoholic smell. Further, it is free of unpleasant fatty greasy taste and/or smell for the oil/fat content is 1–25 weight %.

Moreover, since the overrun percentage is set to be as low as 10–100, the amount of tiny pieces of ice of a given volume of ice cream is not too much reduced due to increase of air per unit volume of ice cream, hence there is no possibility of losing the taste of chilliness when drunk being affected, and the mouth feel and the feel to the tongue are both kept nice.

Furthermore, the ice cream as material of milk shake may, if and as necessary, be mixed with tiny pieces of ice for further improving iciness and the cool, refreshing taste of milk shake thus obtained.

TABLE 1

|  | 1-1 Control example | 1-2 Control example | 1-3 Control example | 1-4 Embodiment | 1-5 Embodiment |
| --- | --- | --- | --- | --- | --- |
| Sugars (weight %) | 15.0 | 15.0 | 15.0 | 15.0 | 15.0 |
| Skim milk powder (weight %) | 5.0 | 5.0 | 5.0 | 5.0 | 5.0 |
| Sodium caseinate (weight %) | 1.5 | 1.5 | 1.5 | 1.5 | 1.5 |
| Glycerin fatty acid ester (weight %) | 1.0 | 1.0 | 1.0 | 1.0 | 1.0 |
| Palm oil (weight %) | 15.0 | 15.0 | 15.0 | 15.0 | 15.0 |
| Alcohol (weight %) | 0.0 | 0.3 | 0.5 | 1.0 | 1.3 |
| Homogenizing pressure (kg/cm²) | 35/140 = 175 | 35/140 = 175 | 35/140 = 175 | 35/140 = 175 | 35/140 = 175 |
| Cream overrun (%) | 44 | 42 | 40 | 38 | 38 |
| Rheometer reading at −20° C. (g) | 1460 | 1050 | 700 | 460 | 387 |
| Shakability | X | X | X | Δ | O |
| Other evaluation |  |  |  |  |  |

|  | 1-6 Control example | 2-1 Control example | 2-2 Embodiment | 2-3 Embodiment | 2-4 Embodiment |
| --- | --- | --- | --- | --- | --- |
| Sugars (weight %) | 15.0 | 17.5 | 17.5 | 17.5 | 17.5 |
| Skim milk powder (weight %) | 5.0 | 5.0 | 5.0 | 5.0 | 5.0 |
| Sodium caseinate (weight %) | 1.5 | 1.5 | 1.5 | 1.5 | 1.5 |
| Glycerin fatty acid ester (weight %) | 1.0 | 1.0 | 1.0 | 1.0 | 1.0 |
| Palm oil (weight %) | 15.0 | 15.0 | 15.0 | 15.0 | 15.0 |
| Alcohol (weight %) | 1.5 | 0.0 | 0.3 | 0.5 | 1.0 |
| Homogenizing pressure (kg/cm²) | 35/140 = 175 | 35/140 = 175 | 35/140 = 175 | 35/140 = 175 | 35/140 = 175 |
| Cream overrun (%) | 36 | 36 | 35 | 34 | 33 |
| Rheometer reading at −20° C. (g) | 360 | 816 | 490 | 338 | 269 |
| Shakability | O | X | Δ | O | O |
| Other evaluation | Alcoholic smell |  |  |  |  |

In the above table "X" means unshakable, "Δ" means shakable and "O" means easily shakable.

TABLE 2

|  | 2-5 Embodiment | 2-6 Control example | 3-1 Control example | 3-2 Embodiment |
|---|---|---|---|---|
| Sugars (weight %) | 17.5 | 17.5 | 20.0 | 20.0 |
| Skim milk powder (weight %) | 5.0 | 5.0 | 5.0 | 5.0 |
| Sodium caseinate (weight %) | 1.5 | 1.5 | 1.5 | 1.5 |
| Glycerin fatty acid ester (weight %) | 1.0 | 1.0 | 1.0 | 1.0 |
| Palm oil (weight %) | 15.0 | 15.0 | 15.0 | 15.0 |
| Alcohol (weight %) | 1.3 | 1.5 | 0.0 | 0.3 |
| Homogenizing pressure (kg/cm$^2$) | 35/140 = 175 | 35/140 = 175 | 35/140 = 175 | 35/140 = 175 |
| Cream overrun (%) | 35 | 35 | 35 | 34 |
| Rheometer reading at −20° C. (g) | 264 | 255 | 497 | 297 |
| Shakability | O | Δ | O | O |
| Other evaluation |  | Alcoholic smell | Too high sweetness |  |

|  | 3-3 Embodiment | 3-4 Embodiment | 3-5 Embodiment | 3-6 Control example |
|---|---|---|---|---|
| Sugars (weight %) | 20.0 | 20.0 | 20.0 | 20.0 |
| Skim milk powder (weight %) | 5.0 | 5.0 | 5.0 | 5.0 |
| Sodium caseinate (weight %) | 1.5 | 1.5 | 1.5 | 1.5 |
| Glycerin fatty acid ester (weight %) | 1.0 | 1.0 | 1.0 | 1.0 |
| Palm oil (weight %) | 15.0 | 15.0 | 15.0 | 15.0 |
| Alcohol (weight %) | 0.5 | 1.0 | 1.3 | 1.5 |
| Homogenizing pressure (kg/cm$^2$) | 35/140 = 175 | 35/140 = 175 | 35/140 = 175 | 35/140 = 175 |
| Cream overrun (%) | 38 | 30 | 32 | 30 |
| Rheometer reading at −20° C. (g) | 185 | 169 | 148 | 140 |
| Shakability | O | O | O | O |
| Other evaluation |  |  |  | Alcoholic smell |

In the above table "Δ" means shakable and "O" means easily shakable.

TABLE 3

|  | 4 Embodiment |
|---|---|
| Sugars (weight %) | 15.0 |
| Skim milk powder (weight %) | 10.0 |
| Sodium caseinate (weight %) | 1.5 |
| Glycerin fatty acid ester (weight %) | 1.0 |
| Rape seed oil (weight %) | 10.0 |
| Alcohol (weight %) | 0.5 |
| Flavors (weight %) | 0.1 |
| Homogenizing pressure (kg/cm$^2$) | 35/140 = 175 |
| Cream overrun (%) | 50 |
| Tiny pieces of ice (weight %) | 10 |
| Rheometer reading at −20° C. (g) | 420 |
| Shakability | O |
| Other evaluation |  |

In the above table "O" means easily shakable.

What is claimed is:

1. A milk shake product comprising soft ice cream which comprises 15.30–40 weight % of carbohydrates containing 15–35 weight % of sugar and 0.3–1.3 weight % of alcohol, 1–7 weight % of protein and 1–25 weight % of oil/fat, and the overrun percentage being set at 10 to 100, said soft ice cream being in such a beaten state as can be drunk with a straw.

2. A milk shake product comprising
soft ice cream which comprises 15.3–40 weight % of carbohydrates containing 15–35 weight % of sugar and 0.3–1.3 weight % of alcohol, 1–7 weight % of protein and 1–25 weight % of oil/fat, the overrun percentage being set at 10 to 100, said soft ice cream being in such a beaten state as can be drunk with a straw and having countless tiny pieces of ice distributed therein.

3. A method of manufacturing a milk shake product comprising the steps of
preparing a mixture by mixing 15.3–40 weight % of carbohydrates containing 15–35 weight % of sugar and 0.3–1.3 weight % of alcohol, and 1–7 weight % of protein and 1–25 weight % of oil/fat,
obtaining ice cream by freezing said mixture at an overrun percentage of 10 to 100,
simply beating said ice cream with or without addition of syrup, and
shaking said ice cream.

4. A method of manufacturing a milk shake product comprising the steps of
preparing a mixture by mixing 15.3–40 weight % of carbohydrates containing 15–35 weight % of sugar and 0.3–1.3 weight % of alcohol, and 1–7 weight % of protein and 1–25 weight % of oil/fat,
freezing said mixture,
obtaining ice cream having tiny pieces of ice by kneading said frozen mixture with countless tiny pieces of ice of diameters not greater than 10 mm at an overrun percentage of 10 to 100,
simply beating said ice cream with or without addition of syrup, and
shaking said ice cream in a temperature range of −20° C. to −8° C.

5. A method of manufacturing a milk shake product comprising the steps of
preparing a mixture by mixing 45–70 weight % of water content and 15.3–40 weight % of carbohydrates containing 15–35 weight % of sugar and 0.3–1.3 weight % of alcohol, and 1–7 weight % of protein and 1–25 weight % of oil/fat,
obtaining ice cream by having said mixture filtrated, homogenized, sterilized, cooled, aged, frozen at an overrun percentage of 10 to 100, filled in packing containers and hardened,
simply beating said ice cream with or without addition of syrup, and
shaking said ice cream in a temperature range of −20° C. to −8° C.

6. The product of claim 2 wherein said pieces of ice have diameters in the range of 1-5 mm.

7. The method of claim 4 wherein said pieces of ice have diameters in the range of 1-5 mm.

8. The method of claim 3 wherein said syrup comprises a fruit sauce.

9. The method of claim 4 wherein said syrup comprises a fruit sauce.

10. The method of claim 5 wherein said syrup comprises a fruit sauce.

11. The product of claim 1 wherein the overrun percentage is set at 40-80.

12. The product of claim 2 wherein the overrun percentage is set at 40-80.

13. The product of claim 2 wherein the mixing ratio of said tiny pieces of ice is 3-50 weight %.

14. The method of claim 3 wherein the overrun percentage is 40-80.

15. The method of claim 4 wherein the overrun percentage is 40-80.

16. The method of claim 4 wherein the mixing ratio of said tiny pieces of ice is 3-50 weight %.

17. The method of claim 5 wherein the overrun percentage is 40-80.

* * * * *